United States Patent
Ozaki et al.

(10) Patent No.: US 6,294,291 B1
(45) Date of Patent: Sep. 25, 2001

(54) SECONDARY BATTERY OR CELL WITH A NON-AQUEOUS ELECTROLYTE

(75) Inventors: Yoshiyuki Ozaki; Nobuo Eda; Akiyoshi Morita, all of Osaka-fu (JP)

(73) Assignee: Matsushita Electric Industrial Co., Ltd., Osaka-Fu (JP)

(*) Notice: Subject to any disclaimer, the term of this patent is extended or adjusted under 35 U.S.C. 154(b) by 0 days.

(21) Appl. No.: 07/863,043

(22) Filed: Apr. 3, 1992

Related U.S. Application Data

(63) Continuation-in-part of application No. 07/709,995, filed on Jun. 4, 1991, now abandoned.

(30) Foreign Application Priority Data

Jan. 17, 1991 (JP) .................................................. 3-18477

(51) Int. Cl.$^7$ ............................. H01M 4/58; H01M 10/40
(52) U.S. Cl. ..................... 429/231.4; 429/324; 429/232
(58) Field of Search .................................... 429/194, 217, 429/218, 232, 231.4, 324

(56) References Cited

U.S. PATENT DOCUMENTS

| | | | |
|---|---|---|---|
| 4,980,250 | * 12/1990 | Takahashi et al. | 429/194 |
| 5,028,500 | * 7/1991 | Fong et al. | 429/194 |
| 5,153,082 | * 10/1992 | Ogina et al. | 429/194 |

FOREIGN PATENT DOCUMENTS

WO 90/13924    11/1990   (WO).

* cited by examiner

*Primary Examiner*—Carol Chaney
(74) *Attorney, Agent, or Firm*—Wenderoth, Lind & Ponack, L.L.P.

(57) ABSTRACT

A secondary battery with non-aqueous electrolyte having a high voltage and energy density and a superior cycle property, characterized in that a cathode comprises composite oxides containing lithium and an anode comprises composite carbon materials containing graphite spherical particles and carbon fibers. The carbon fiber improves the stiffness of the anode depolarizing mix to prevent the body made thereof from swelling and decomposing.

4 Claims, 3 Drawing Sheets

SECONDARY BATTERY OR CELL WITH A NON-AQUEOUS ELECTROLYTE

This application is a continuation-in-part of Ser. No. 07/709,995 filed Jun. 4, 1991 now abandoned.

FIELD OF THE INVENTION

The present invention relates to a secondary battery or cell (hereafter merely referred to as battery) with a non-aqueous electrolyte, particularly to a small-sized, light-weight, new secondary battery.

BACKGROUND OF THE INVENTION

Recently portable and cordless tendency in electronic appliances for general use have been rapidly progressing. Accordingly, a demand for a small-sized, light-weight secondary battery having a high energy density, used for charge and discharge power supply for driving a motor, has been increasing. From this point of view, non-aqueous batteries, and particularly secondary lithium batteries are anticipated as batteries having high voltage and energy densities and the development of these batteries is urged. Conventionally, manganese dioxide, vanadium pentaoxide, titanium disulfide and the like have been used as a cathode active material of the secondary lithium batteries. Such a battery comprises a cathode of these materials, a lithium anode and an organic electrolyte and charge and discharge of electricity are repeated. However, in a secondary battery employing a lithium metal anode, the problems of internal short circuit caused by dendritic lithium generated upon charging or side reactions between an active material and an electrolyte are a barrier to developing useful secondary batteries. Further, there has not yet been found a secondary battery which satisfies the high rate charge and discharge property and the over discharge property.

The safety of the lithium batteries has been also severely pointed out and in battery systems employing a lithium metal or a lithium alloy therein as an anode, the safety is very difficult to ensure. On the other hand, a new type of negative electrode has attracted interest, in which the intercalating reaction of layered compounds is utilized for solving the above problems. Particularly graphite compound incorporating anions such as $ClO_4$-ion, $PF_6$-ion, $BF_4$-ion and the like is used as a cathode or positive electrode; and graphite compound incorporating cations such as Li+, Na+ and the like is supposed to be used as an anode or negative electrode.

However, intercalated graphite incorporating cations therein is very unstable, so that in the case of using natural or artificial graphite as an anode, the battery lacks stability and the capacity thereof is low. Further, since decomposition of the electrolyte takes place, intercalated graphite cannot be used in place of a lithium anode.

Lately, it has been found that lithium doped materials of pseudo graphite materials obtained by carbonization of a variety of hydrocarbon or polymeric materials are effective as an anode material and can exhibit a high efficiency and further have excellent stability in a battery. Accordingly, many researches on small-sized, light-weight batteries with the use of these materials have been made.

On the other hand, accompanied with use of carbon materials as an anode, it is proposed that such Li-contained compounds having higher voltage as $LiCoO_2$ or $LiMn_{20}O_4$ or composite oxide in which a part of Co and Mn is displaced by other elements such as, for example, Fe, Co, Ni, Mn and so on, are to be used as a cathode active material.

The amount of lithium occluded and released upon using the afore-mentioned pseudo graphite materials having more or less turbostratic structures as an anode material was measured to obtain the capacity of only 100–150 mAh/g carbon and also polarization of carbon electrode, accompanied with the electric charge and discharge, is intensified. Therefore, when these carbon anode materials are used in combination with a cathode of, for example, $LiCoO_2$ and so on, it is difficult to obtain a satisfactory capacity and voltage.

On the other hand, it has been reported that in the case of using a high crystalline graphite material as an anode, intercalation reaction of lithium is difficult to proceed due to the gas generated upon charging on the surface of the graphite electrode surface by the decomposition of an electrolyte. It is found that in spite of generating the gases, coke and the like heat-treated at a high temperature gives relatively high capacity (200–250 mAh/g). However, due to the large expansion and contraction of the graphite in the C axis direction, accompanied with the charge and discharge, the anode body is swollen, by which the original shape cannot be kept. Therefore, there is a serious problem in the cycle property.

Thus, an object of the present invention is to provide a secondary battery with non-aqueous electrolyte, having high voltage, high capacity and an excellent cycle property, by which the above-mentioned conventional problems can be solved.

SUMMARY OF THE INVENTION

For the purpose of overcoming these problems, according to the present invention, by using a composite carbon material comprising carbon fibers and graphite spherical particles as an anode, particularly by using a composite carbon material comprising carbon fibers and spherical graphite particles having a lattice spacing (d002) of 3.36 to 3.42 Å, measured by a wide angle X-ray diffraction method, satisfactory high stiffness and charge and discharge conductivity of the anode can be obtained and thus the swelling and decomposition of the body made thereof can be prevented.

Generally, it is reported that the uppermost limit of content of lithium intercalated chemically between the graphite layers is corresponding to that of intercalated graphite $C_6Li$ of the first stage wherein there is intercalated one lithium atom per 6 carbon atoms. In this case, the active material has a capacity of 372 mAh/g. When a pseudo graphite material as the abovementioned is used, the intercalation content of lithium is only a few due to the undeveloped layered structure and the charge-discharge reactions are progressing in a noble potential (about +1.0 V) versus the lithium potential, and therefore pseudo graphite materials are not suitable for an anode material.

As a result of the research for the shapes of the carbon materials, it has been also found that graphite spherical particles provided with an optically anisotropic and single phase are preferred for an anodic graphite material and such graphite spherical particles may be meso-carbon microbeads produced by subjecting mesophase spherules, produced during the carbonization process of pitch, as a raw material to heat treatment for graphitization. In any of these materials, the graphitization step is an important factor and the lattice spacing (d002) at 002 plane is preferably from 3.36 to 3.42 Å and more preferably 3.40 Å or less. In the state of pseudo graphite having a d002 of about 3.43 Å or more, the capacity is low and the polarization of the carbon electrode is intensified in the same manner as in the other pseudo graphite materials.

As stated above, however, in the case of using the graphite spherical particles as an anode, the swelling and decomposition of the anode body may be observed and thus the capacity deterioration becomes large, accompanied with charge-discharge cycle, despite the high initial capacity of 200–250 mAh/g carbon.

According to the present invention, therefore, the above-mentioned problems can be solved by using a composite carbon material comprising the graphite spherical particles material mixed with carbon fibers to intensify the stiffness of the anode and thus prevent the anode body from swelling and decomposing.

As one of example of the carbon fiber used in the invention, there is exemplified a vapor grown carbon fiber. The carbon fiber may be prepared by subjecting hydrocarbons such as benzene, methane, propane and so on to vapor phase heat-decomposition under the presence of catalyst base plate made of Fe, Ni, Co and so on in order to make carbon fibers deposit and grow on the base plate. Other examples are pitch carbon fibers, made from petroleum or coal pitch as a raw material through a spinning and carbonating treatment, and PAN(polyacrylonitrile) carbon fibers made from polyacrylonitrile as a raw material, which may be used in the invention.

In the present invention, the mixture ratio between the graphite material and the carbon fiber is an important factor. The carbon fiber content of the composite carbon material is preferably from 5 wt. % to 20 wt. %, more preferably from 5 wt. % to 15 wt. % on the basis of the graphite weight.

If the content is below 5 wt. %, the addition effect is not satisfactorily exhibited and thus the charge-discharge cycle property becomes worse. Further if the content is beyond 20 wt. %, the packing density of graphite comprising spherical particles becomes relatively decreased and thus the capacity of the battery lowers.

On the other hand, as a cathode material, there can be used composite oxides containing lithium such as $LiCoO_2$ and $LiMnO_4$ or their any other composite oxide thereof in which a part of Co or Mn is displayed by other elements, for example, Co, Mn, Fe, Ni and so on. In accordance with an objective composition, the composite oxides can be easily made from carbonate or oxide of lithium or cobalt as the raw materials by mixing and heat-treating them. Needless to say, other raw materials may be used similarly so as to prepare the composite oxide. The heat-treating temperature usually ranges from 650° C. to 1200° C.

Any known or available electrolytes and separators may be used and are not particularly limited.

According to the present invention, the graphite spherical particles comprising an optically anisotropic and single phase is suitable for intercalation/deintercalation reaction because of the anisotropic structure and spherical shape. In this case, side reactions such as electrolyte decomposition hardly take place than in a case of any other graphite materials. However, swelling of the anode body is observed accompanied with the charge-discharge cycle and the resulting bad contact between the particles causes a remarkable deterioration of the capacity. Therefore, according to the present invention, such a capacity deterioration can be solved by mixing and dispersing of carbon fibers to the graphite particle material improve the stiffness of the anode depolarizing mixture and also keep the good contact between particles.

Accordingly, the combination of the anode comprising graphite/carbon fiber composite material and the cathode comprising the Li contained composite oxide provides a secondary battery having a high voltage and large capacity and also a superior cycle property.

DETAILED DESCRIPTION OF THE PREFERRED EMBODIMENT

The preferred embodiment of the present invention will be explained in detail.

Figure 1:
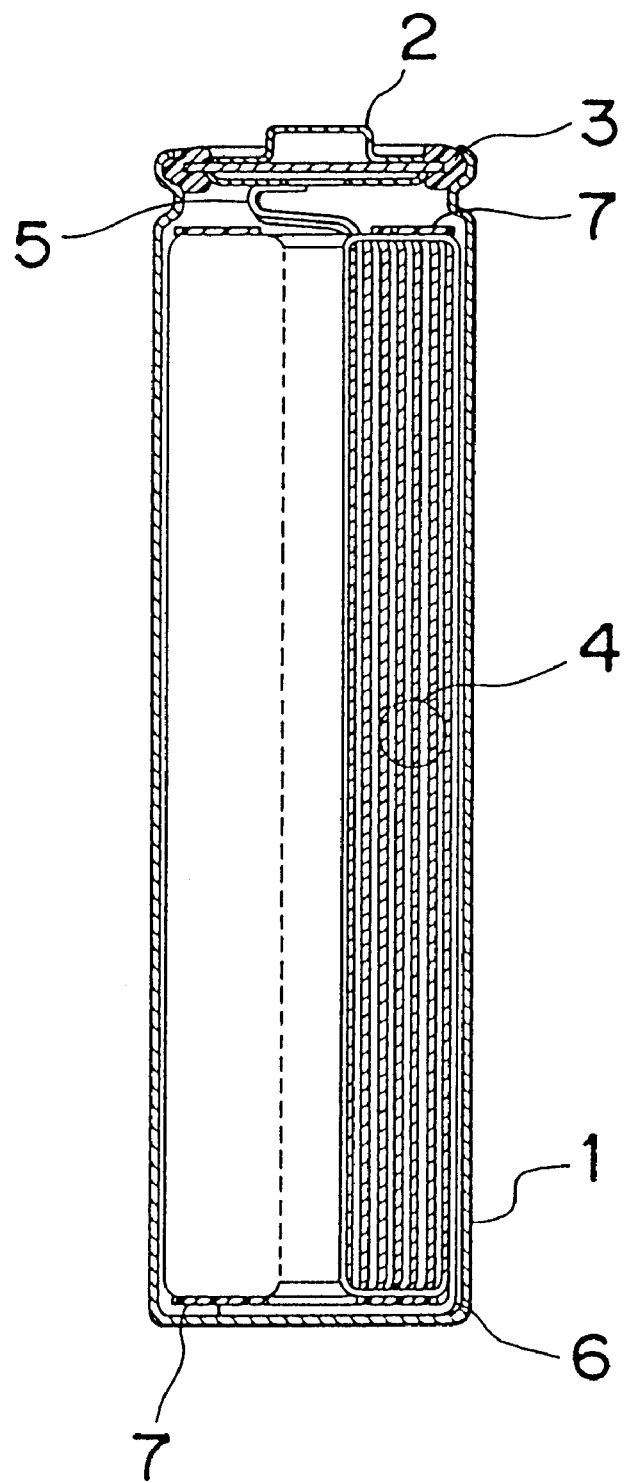
FIG. 1 is a longitudinal sectional view showing a cylindrical battery according to the embodiment of the present invention.

FIG. 1 shows a longitudinal sectional view of a cylindrical battery employed in the present embodiment. 1 denotes a battery case made of a stainless steel plate which organic electrolyte-proof, 2 denotes a sealing plate provided with a safety valve and 3 denotes an insulating packing. 4 is a bundle of electrode plates, in which anode and cathode plates are spirally wound several times through separators to be accommodated in the case 1. A cathode lead 5 is taken out of the cathode and connected to the sealing plate 2. An anode lead 6 is taken out of the anode and connected to the bottom of the battery case 1. 7 denotes insulating rings, each of which is provided at upper and lower sides of the bundle of electrode plates, respectively. Hereafter, the anode and cathode plates and the electroyte and so on will be explained in detail.

The cathode is formed as follows.

100 weight parts of $LiCoO_2$ powder synthesized by heat-treating at 900° C. for ten hours after mixing $Li_2Co_3$ and $COCO_3$, 3 wt. parts of acetylene black, 4 wt. parts of graphite and 7 wt. parts of fluorocarbon resin binder are mixed and then suspended in a carboxymethyl cellulose aqueous solution to form a paste. The paste is applied to both sides of aluminum foil of 0.03 mm in thickness, dried and rolled to form an electrode plate of 0.18 mm in thickness, 40 mm in width and 260 mm in length.

The anode is formed as follows.

Meso-carbon microbeads (d002=3.37 Å) heat-treated at 2800° C. (hereinafter referred to as MCMB) and vapor grown carbon fiber (d002=3.42 Å) (hereinafter referred to as VGCF) or pitch carbon fiber (d002=3.42 Å) are mixed in a mixture ratio shown in Table 1 to prepare a composite carbon material. To 100 weight parts of the composite carbon material, 10 weight parts of fluorocarbon resin is mixed and then suspended in a carboxymethyl cellulose aqueous solution to form a paste. The paste is applied to both sides of copper foil of 0.02 mm thickness, dried and rolled to form an electrode plate of 0.19 mm in thickness, 40 mm in width, 280 mm in length.

The leads are attached to the cathode and anode plates respectively, and the plates are spirally wound through a separator of 0.025 mm in thickness, 46 mm in width, 700 mm in length, made of polypropylene with multiple perforates to be stored in the battery case of 14.0 mm in diameter and 50 mm in height. Equivalent volume mixed solvent of propylene carbonate and ethylene carbonate, dissolving lithium perchlorate therein in the ratio of 1 mol/l, is used as the electrolyte.

The sealing is carried out to obtain the battery of the embodiment.

Figure 2:
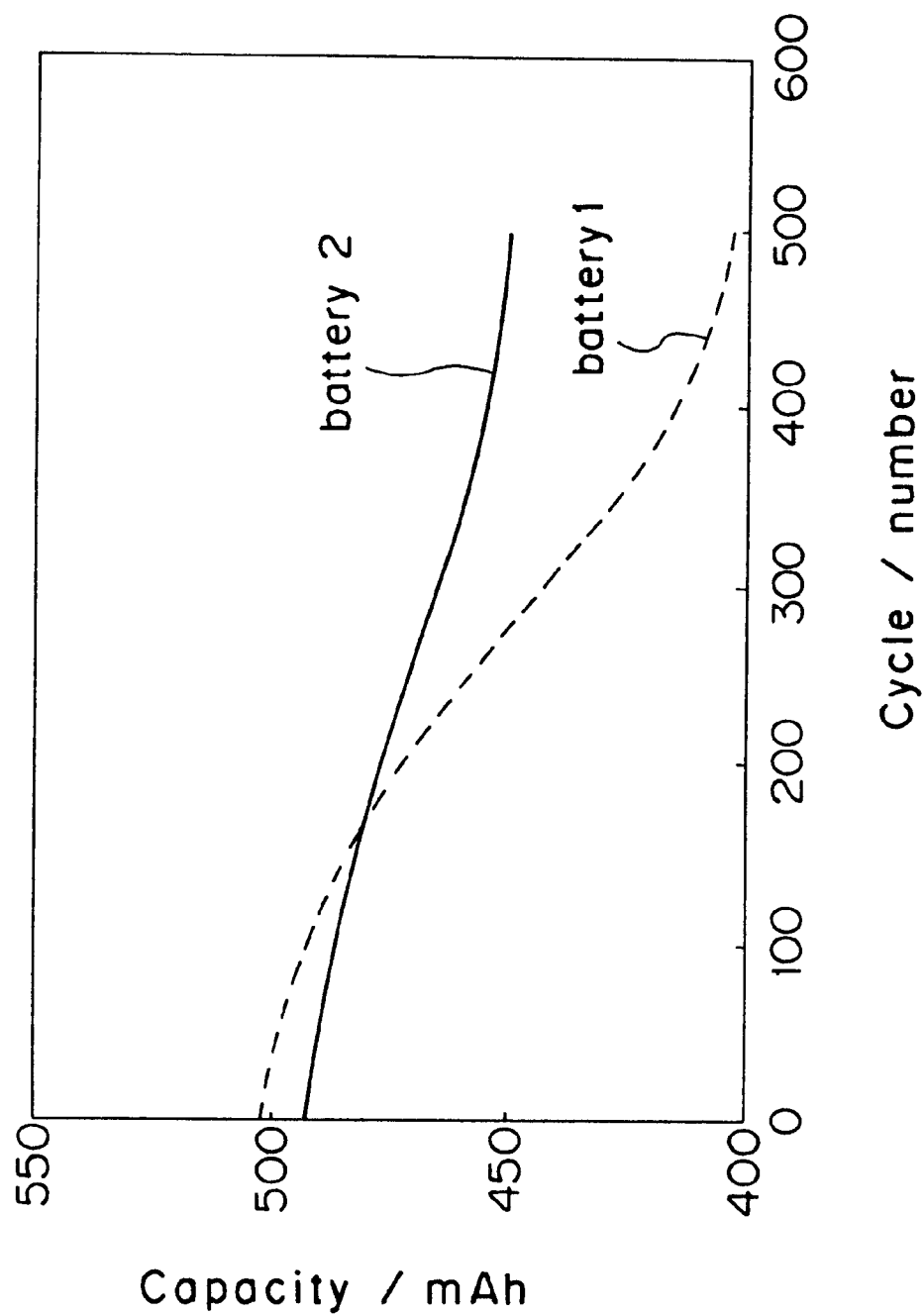
FIG. 2 comparatively shows the cycle properties.

Experiment of charge and discharge at a constant current of the batteries is carried out under the conditions of 100 mA of charge and discharge, 4.1 V of the last charge and 3.0 V of the last discharge. FIG. 2 comparatively shows the cycle properties.

TABLE 1

| Battery No. | Carbon fiber mixture ratio (%) (on the basis of MCMB weight) | Carbon fiber | Capacity/mAh (10th cycle) |
|---|---|---|---|
| 1 | 0 | — | 502 |
| 2 | 5 | VGCF | 492 |
| 3 | 5 | Pitch carbon fiber | 494 |
| 4 | 20 | VGCF | 475 |
| 5 | 25 | VGCF | 310 |

As seen clearly from Table 1, in the case of the battery 1 including no carbon fiber, a primary capacity is as large as 500 mAh or more while a capacity deterioration becomes remarkable accompanied with charge-discharge cycle (FIG. 2). On the other hand, in the case of the batteries 2–4 containing 5 to 20% of VGCF or pitch carbon fiber, it is found that a capacity deterioration is quite small while a high capacity is kept (the charge-discharge cycle of battery 2 is shown in FIG. 2). In the case of the battery 5 containing 25 wt. % of VGCF, the capacity is quite small although the cycle property is relatively good. This reason is in that VGCF has a small packing density and thus the depolarizing mix amount ratio therein relatively decreases. In any case, average discharge voltages were about 3.7 V.

Further, after 10th cycle of discharge in the batteries constructed under the same condition as above, the tests were stopped and the battery was decomposed to take out the anode plate thereof and observe the surface properties. As a result, in the case of the battery 1, swelling and deforming of the depolarizing mix is remarkable and the original shape can not be maintained.

On the other hand, in the case of the batteries 2 to 5 including composite material mixed with carbon fibers, there is observed no noticeable change such as swelling and deforming of the depolarizing mix and found the fact that the depolarizing mix can stand against the expansion and contraction of the graphite component accompanied with the charge and discharge.

Figure 3A:
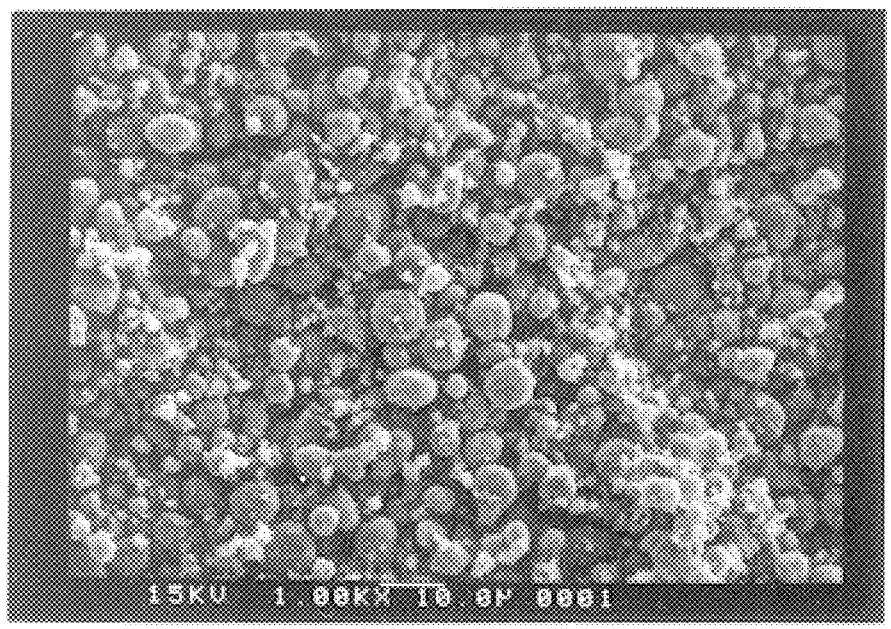
FIG. 3 shows scanning electron microscope photographs of graphite materials comprising spherical particles.
Figure 3B:
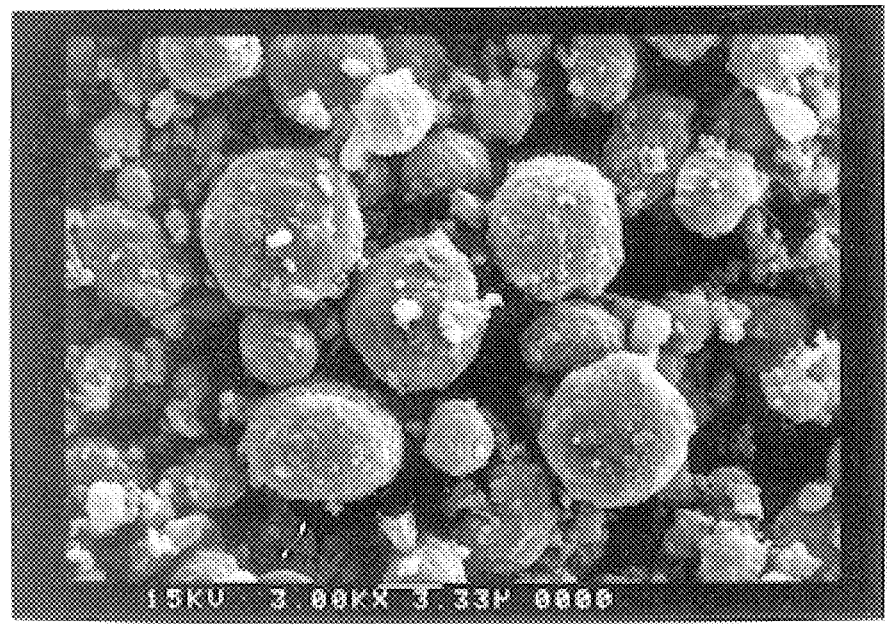

FIG. 3 shows scanning electron microscope photographs (x1000 and x3000) of MCMB used in the example.

Comparative Example 1

Composite carbon material comprising natural graphite (d002=3.36 Å) in place of MCMB, with 5 wt. % of VGCF is used as an anode. The other conditions of the battery in the comparative example 1 are the same as in the battery in the above example.

Comparative Example 2

Composite carbon material comprising needle coke (d002=3.37 Å) applied to heat treatment at 2800° C. in place of MCMB, with 5 wt. % of VGCF is used as an anode. The other conditions of the battery in the comparative example 2 are the same as in the battery in the above example.

The batteries according to comparative examples 1 and 2, were tested for the charge and discharge examination under the same condition as the above example. In the case of the battery according to comparative example 1, gases are largely produced due to the electrolyte decomposition at the primary charge and little intercalation reaction of lithium proceeds, by which only 50 mAh or less in capacity is obtained. On observing the anode plate after the battery is charged, there is found a remarkable swelling and deforming of the depolarizing mix.

In the case of the battery according to comparative example 2, a capacity deterioration becomes remarkable accompanied with the charge and discharge cycle while about 300 mAh of a primary capacity is obtained. That is to say, no effect of the composite structure with carbon fibers was found. On observing the anode plate, there is of course found swelling and deforming of the depolarizing mix.

As is clear from the above explanation, the secondary battery with non-aqueous electrolyte according to the present invention, in which the composite carbon material comprising carbon fibers and graphite materials comprising spherical particles provided with an optically anisotropic and single phase, employed as the anode, has a satisfactory high voltage and capacity and the excellent cycle property.

What is claimed is:

1. A secondary battery or cell with a non-aqueous electrolyte comprising:

a cathode containing composite oxides including lithium;

a non-aqueous electrolyte; and an anode capable of being recharged repeatedly, said anode being a composite carbon material containing carbon fibers and graphite spherical particles, wherein said graphite spherical particles are mesocarbon microbeads.

2. The secondary battery or cell with a non-aqueous electrolyte according to claim 1, wherein said mesocarbon microbeads have a lameller structure and a lattice spacing (d002) of 3.36 to 3.42 Å, measured by a wide angle X-ray diffraction method.

3. The secondary battery or cell with a non-aqueous electrolyte according to claim 1, wherein the carbon fiber content among the carbon material is from 5 wt. % to 20 wt. %.

4. The secondary battery or cell with a non-aqueous electrolyte according to claim 1, wherein the carbon fiber is selected from the group consisting of a vapor grown carbon fiber, a pitch carbon fiber and a PAN carbon fiber.

* * * * *

UNITED STATES PATENT AND TRADEMARK OFFICE
CERTIFICATE OF CORRECTION

PATENT NO. : 6,294,291 B1
DATED : September 25, 2001
INVENTOR(S) : Yoshiyuki Ozaki et al.

It is certified that error appears in the above-identified patent and that said Letters Patent is hereby corrected as shown below:

Column 1,
Line 64, please change "$LiMn_{20}O_4$" to -- $LiMn_2O_4$ --.

Column 4,
Line 34, please change "$COCO_3$" to -- $CoCO_3$ --.

Signed and Sealed this

Seventh Day of May, 2002

Attest:

Attesting Officer

JAMES E. ROGAN
Director of the United States Patent and Trademark Office